United States Patent
Zhang et al.

(10) Patent No.: US 12,153,621 B2
(45) Date of Patent: *Nov. 26, 2024

(54) METHOD OF PERSONALIZED IMAGE AND VIDEO SEARCHING BASED ON A NATURAL LANGUAGE QUERY, AND AN APPARATUS FOR THE SAME

(71) Applicant: SAMSUNG ELECTRONICS CO., LTD., Suwon-si (KR)

(72) Inventors: Haotian Zhang, Toronto (CA); Allan Jepson, Toronto (CA); Iqbal Ismail Mohomed, Toronto (CA); Konstantinos Derpanis, Toronto (CA); Ran Zhang, Toronto (CA); Afsaneh Fazly, Toronto (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/453,838

(22) Filed: Aug. 22, 2023

(65) Prior Publication Data

US 2023/0394079 A1 Dec. 7, 2023

Related U.S. Application Data

(63) Continuation of application No. 17/465,408, filed on Sep. 2, 2021, now Pat. No. 11,755,638.
(Continued)

(51) Int. Cl.
*G06F 16/535* (2019.01)
*G06N 20/00* (2019.01)

(52) U.S. Cl.
CPC .......... *G06F 16/535* (2019.01); *G06N 20/00* (2019.01)

(58) Field of Classification Search
CPC .............................. G06F 16/535; G06N 20/00
See application file for complete search history.

(56) References Cited

U.S. PATENT DOCUMENTS

| 6,816,858 | B1 | 11/2004 | Coden et al. |
| 8,285,713 | B2 | 10/2012 | Luo et al. |
| | | (Continued) | |

OTHER PUBLICATIONS

Communication dated May 2, 2022, issued by the International Searching Authority in counterpart International Application No. PCT/KR2022/000270 (PCT/ISA/210 and PCT/ISA/237).

(Continued)

*Primary Examiner* — Jared M Bibbee
(74) *Attorney, Agent, or Firm* — Sughrue Mion, PLLC

(57) ABSTRACT

A method of personalized image retrieval includes obtaining a natural language query including a name; replacing the name in the natural language query with a generic term to provide an anonymized query and named entity information; obtaining a plurality of initial ranking scores and a plurality of attention weights corresponding to a plurality of images using a trained scoring model that inputs the anonymized query and the plurality of images; obtaining a plurality of delta scores corresponding to the plurality of images using a re-scoring model that inputs the plurality of attention weights and the named entity information; and obtaining a plurality of final ranking scores by modifying the plurality of initial ranking scores based on the plurality of delta scores. The trained scoring model performs semantic based searching and the re-scoring model determines a probability that faces detected in the plurality of images correspond to the name.

20 Claims, 8 Drawing Sheets

Related U.S. Application Data

(60) Provisional application No. 63/151,293, filed on Feb. 19, 2021.

(56) References Cited

U.S. PATENT DOCUMENTS

| | | | |
|---|---|---|---|
| 9,411,827 B1 | 8/2016 | Bau et al. | |
| 10,546,197 B2 | 1/2020 | Shrestha et al. | |
| 10,593,085 B2* | 3/2020 | Kemelmaher | G06F 16/51 |
| 10,785,510 B2 | 9/2020 | Koul et al. | |
| 11,526,549 B2 | 12/2022 | Alcantara et al. | |
| 2008/0130960 A1 | 6/2008 | Yagnik | |
| 2009/0292685 A1* | 11/2009 | Liu | G06F 16/73 |
| | | | 707/999.005 |
| 2011/0184940 A1* | 7/2011 | Fazil | G06F 16/3349 |
| | | | 707/E17.084 |
| 2013/0218858 A1* | 8/2013 | Perelman | G06F 16/9535 |
| | | | 707/706 |
| 2014/0222831 A1* | 8/2014 | Ramkumar | G06F 16/95 |
| | | | 707/748 |
| 2016/0170994 A1 | 6/2016 | Soderberg et al. | |
| 2017/0140212 A1* | 5/2017 | Lo | G06V 40/171 |
| 2018/0052932 A1* | 2/2018 | Catalano | G06F 16/24575 |
| 2019/0266288 A1* | 8/2019 | Shukla | G06F 16/9535 |

OTHER PUBLICATIONS

Junjie Cai et al, "An Attribute-Assisted Reranking Model for Web Image Search", IEEE, pp. 261-272 (Year: 2015).

Sebastian Schuster et al., "Generating Semantically Precise Scene Graphs from Textual Descriptions for Improved Image Retrieval", Proceedings of the Fourth Workshop on Vision and Language, Sep. 18, 2015, pp. 70-80, DOI: 10.18653/v1/W15-2812.

European Extended Search Report issued Mar. 15, 2024 by the European Patent Office for EP Patent Application No. 22756356.6.

* cited by examiner

METHOD OF PERSONALIZED IMAGE AND VIDEO SEARCHING BASED ON A NATURAL LANGUAGE QUERY, AND AN APPARATUS FOR THE SAME

CROSS-REFERENCE TO RELATED APPLICATIONS

This application is a continuation application of U.S. patent application Ser. No. 17/465,408, filed on Sep. 9, 2021, which claims priority to U.S. Provisional Patent Application No. 63/151,293, filed on Feb. 19, 2021, in the U.S. Patent & Trademark Office, the disclosures of which are incorporated by reference herein in their entireties.

BACKGROUND

1. Field

The disclosure relates to video searching, and more particularly to a method of personalized image and video searching based on a natural language query including proper names, and an apparatus for the same.

2. Description of Related Art

Image searching is becoming increasingly popular due to an increasing amount of stored data corresponding to images and videos. Related image searching processes input independent keywords that correspond to either labels of detectors or close synonyms/misspellings. These processes cannot process natural language based queries, such as sentences or phrases. Further, these related processes often fail to return appropriate results due to failures in different detectors.

SUMMARY

According to an aspect of the disclosure, a method of personalized image retrieval includes obtaining a natural language query including a name; replacing the name in the natural language query with a generic term to provide an anonymized query and named entity information; obtaining a plurality of initial ranking scores and a plurality of attention weights corresponding to a plurality of images using a trained scoring model that inputs the anonymized query and the plurality of images; obtaining a plurality of delta scores corresponding to the plurality of images using a re-scoring model that inputs the plurality of attention weights and the named entity information; and obtaining a plurality of final ranking scores by modifying the plurality of initial ranking scores based on the plurality of delta scores. The trained scoring model performs semantic based searching. The re-scoring model determines a probability that one or more faces detected in the plurality of images correspond to the name.

According to another aspect of the disclosure, an apparatus for personalized image retrieval, the apparatus includes at least one memory storing instructions; and at least one processor configured to execute the instructions to: obtain a natural language query including a name; replace the name in the natural language query with a generic term to provide an anonymized query and named entity information; obtain a plurality of initial ranking scores and a plurality of attention weights corresponding to a plurality of images using a trained scoring model that inputs the anonymized query and the plurality of images; obtain a plurality of delta scores corresponding to the plurality of images using a re-scoring model that inputs the plurality of attention weights and the named entity information; and obtain a plurality of final ranking scores by modifying the plurality of initial ranking scores based on the plurality of delta scores. The trained scoring model performs semantic based searching. The re-scoring model determines a probability that one or more faces detected in the plurality of images correspond to the name.

According to yet another aspect of the disclosure, a non-transitory computer-readable medium storing instructions comprising: one or more instructions that, when executed by one or more processors, cause the one or more processors to: obtain a natural language query including a name; replace the name in the natural language query with a generic term to provide an anonymized query and named entity information; obtain a plurality of initial ranking scores and a plurality of attention weights corresponding to a plurality of images using a trained scoring model that inputs the anonymized query and the plurality of images; obtain a plurality of delta scores corresponding to the plurality of images using a re-scoring model that inputs the plurality of attention weights and the named entity information; and obtain a plurality of final ranking scores by modifying the plurality of initial ranking scores based on the plurality of delta scores. The trained scoring model performs semantic based searching. The re-scoring model determines a probability that one or more faces detected in the plurality of images correspond to the name.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

Figure 1:
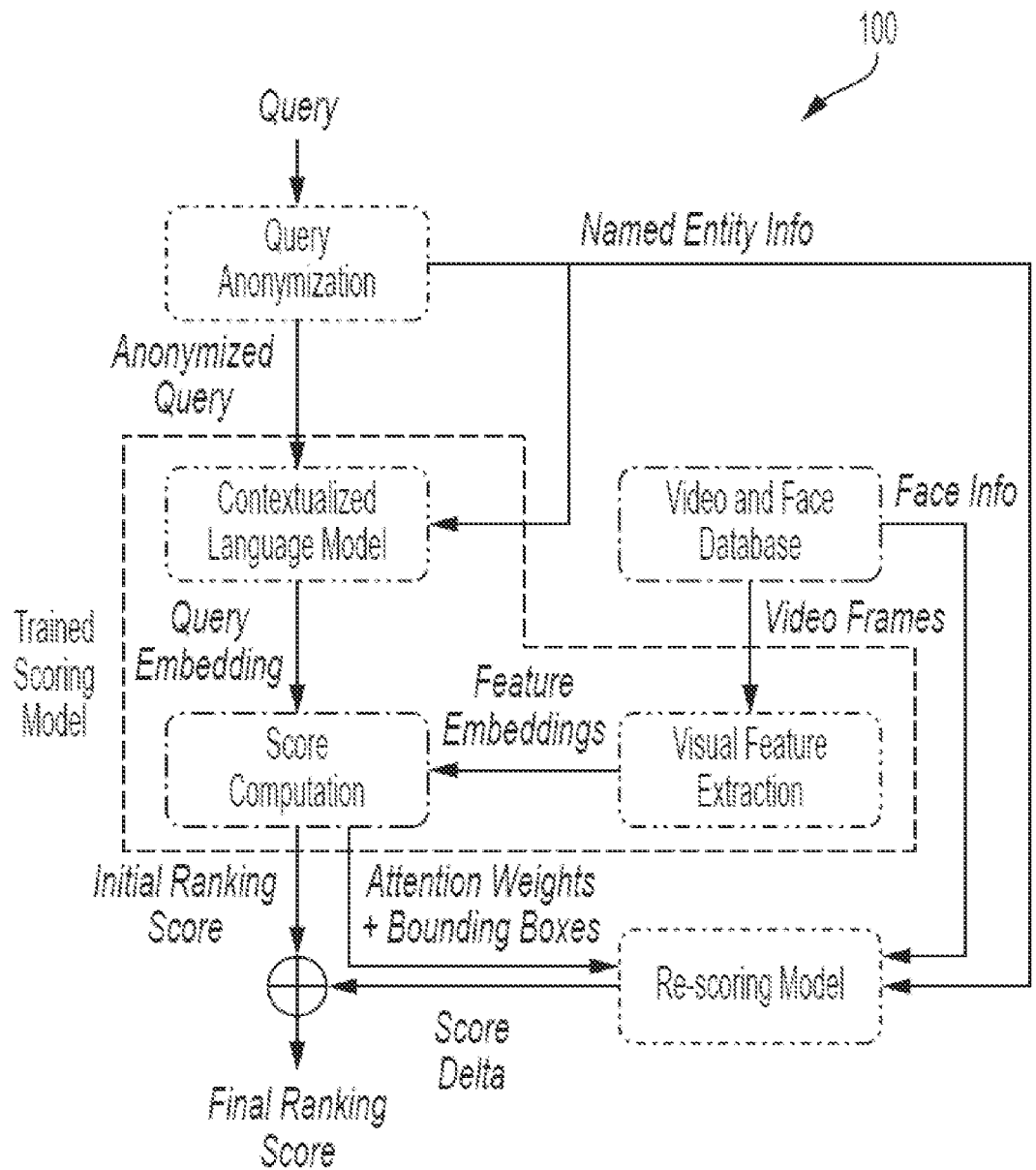
FIG. 1 is a diagram showing a general overview of a method 100 for personalized image and video searching based on natural language inputs according to an embodiment.

FIG. 1 is a diagram showing a general overview of a method 100 for personalized image and video searching based on natural language inputs according to an embodiment.

As shown in FIG. 1, the method 100 may input a query. The query may be a natural language query including proper names such as "Sheldon is standing next to Amy."

A query anonymization operation 110 may be performed on the input natural language query including proper names to obtain an anonymized query and named entity information. An embodiment of the query anonymization is shown in FIGS. 2 and 3.

Figure 2:
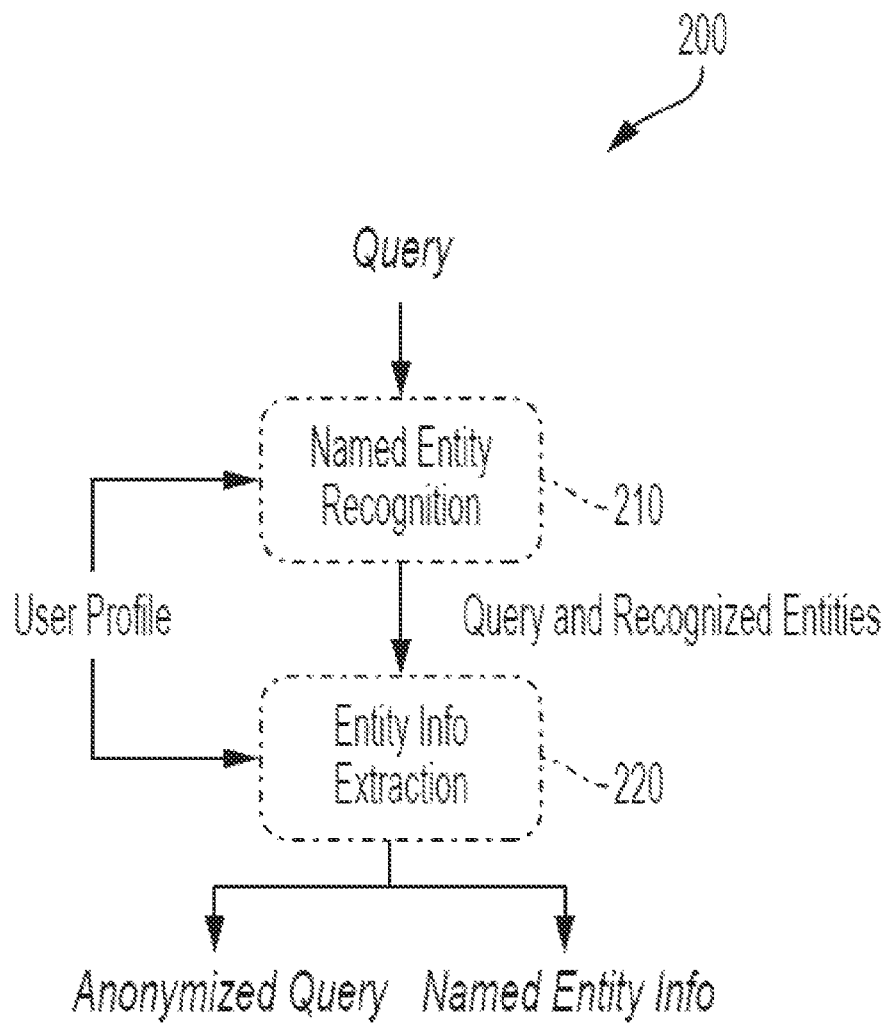
FIG. 2 is flowchart of a query anonymization process according to an embodiment.

As shown in FIG. 2, a name and entity recognition operation 210 may be performed on the query to provide an entity information extraction operation 220 with the query and recognized entities. Based on the input query and recognized entities, the entity information extraction operation 220 obtains a anonymized query and named entity information.

Figure 3:
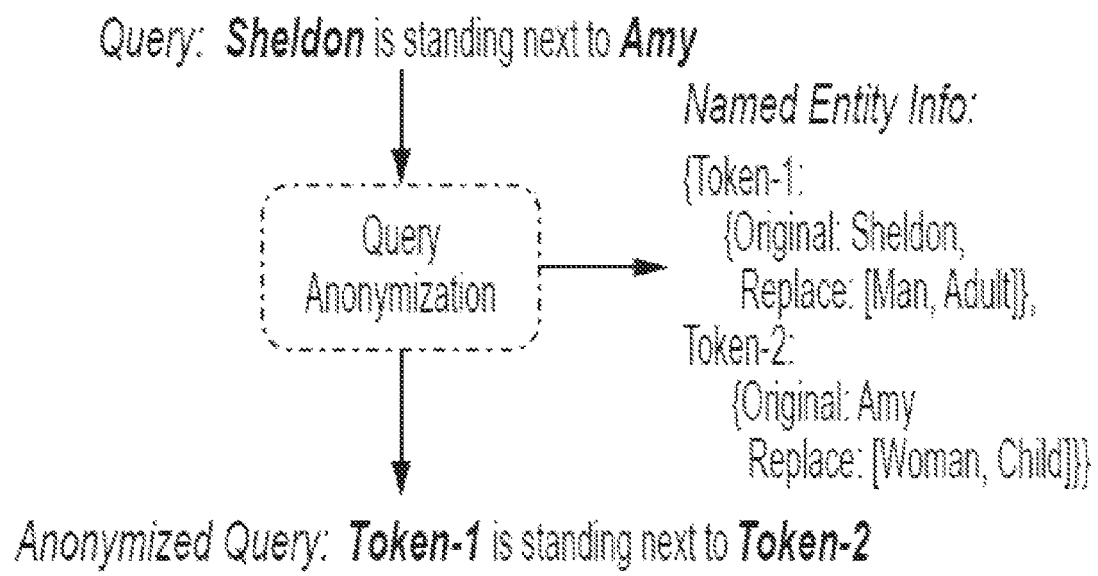
FIG. 3 is a diagram of a query anonymization process according to an embodiment.

FIG. 3 shows an example of an operation for obtaining an anonymized query. As shown in FIG. 3, the named query "Sheldon is standing to next to Amy" is broken down into tokens representing each word, which include Token-1 for the name "Sheldon" and Token-2 for the name "Amy."

Based on Token-1 being detected as a man's name, the token may be replaced by a generic term such as man or adult. Based on Token-2 being detected as a woman's name, the token may be replaced with a generic term such as woman or child. Accordingly, the named query "Sheldon is standing to next to Amy" may be converted to anonymized query "man is standing next to woman."

At operation 120, the anonymized query may be input into a trained scoring model that ranks images based on the anonymized query to obtain initial ranking scores for each image. In the scoring model, a contextualized language model may convert the anonymized query into a vector that is mapped to an embedding space (query embedding). A visual feature extractor may input one or more images from an image or video database, and may extract features from the one or more images. The extracted features may then be converted to a vector that is also mapped to an embedding space (feature embedding).

A score computation may be performed by comparing the query embedding and the feature embedding of an image to provide an initial ranking score for the image. As such, the initial ranking score may indicate an anonymous ranking of an image. The score computation may also output an attention weight corresponding to an images. The attention weight may be obtained by determining a similarity scores based on a comparison between tokens associated with the words of the anonymized query and bounding regions of the images.

As discussed above, the query anonymization operation 110 may output name entity information based on the names in the input query that were replaced by generic terms. The name entity information may be input into the re-scoring model. As shown in FIG. 1, face information provided by a face database may also be input into the rescoring model.

At operation 130, the re-scoring model may generate a delta score based on the attention weights, the face information, and the named entity information. An embodiment of a rescoring model 400 is shown in FIG. 4.

Figure 4:
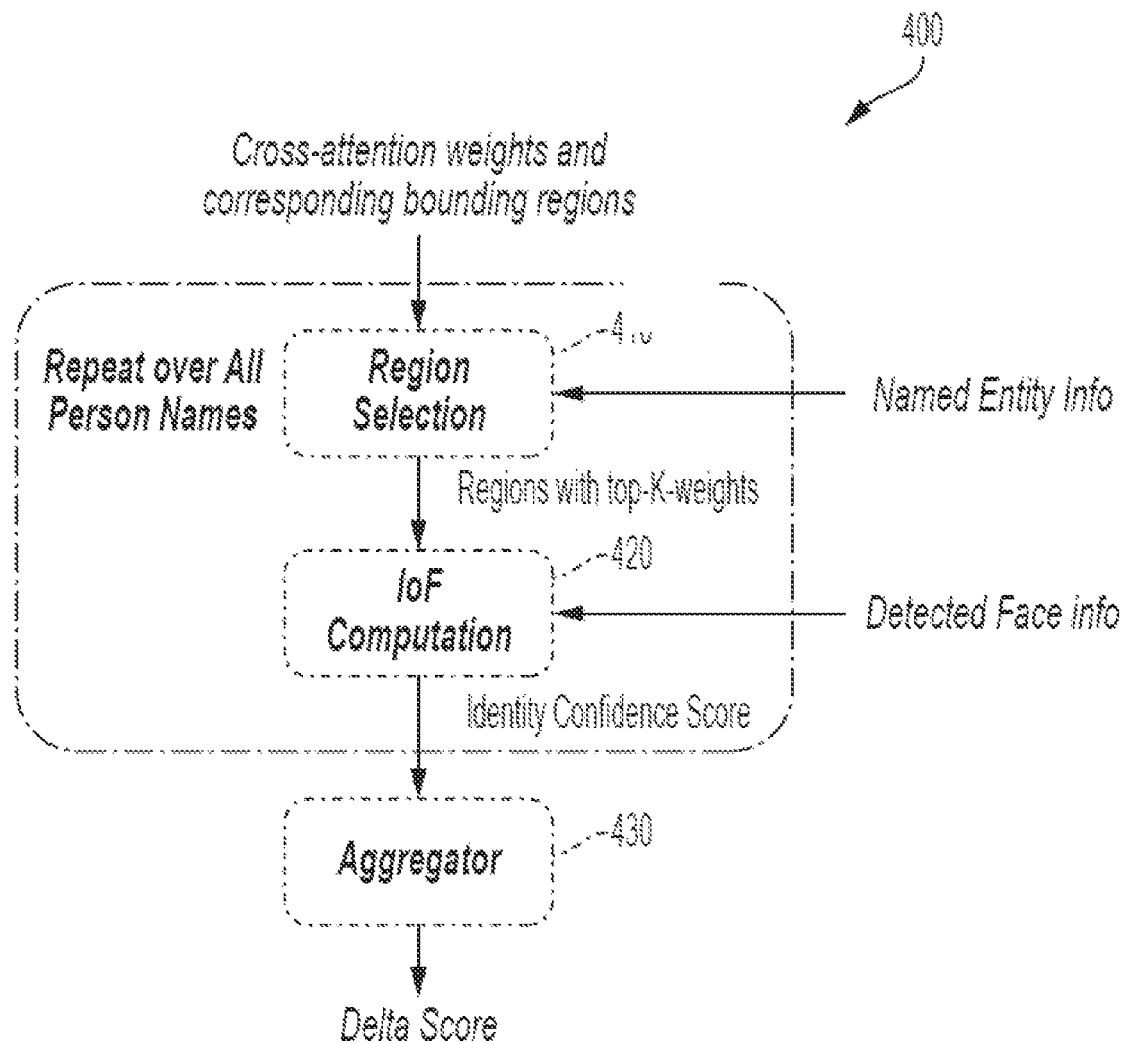
FIG. 4 is a diagram of a re-scoring model according to an embodiment.

As shown in FIG. 4, a region selection operation 410 and an intersection-over-face (IoF) computation 420 are performed for each name extracted from the query.

At the region selection operation 410, regions with the top cross-attention weights are selected and associated with the named entity information (i.e., "Sheldon"). For example, the K-amount of regions with the highest weights ("top-K weights") may be selected and input into the IoF computation with the named entity information.

The IoF computation 420 may obtain an identity confidence score for each of the regions with the top-K weights based on detected face information. For example, the faces detected in the regions with the top-K weights are referenced with the named entity information such as "Sheldon" to determine a probability (confidence score) that the detected face is Sheldon. That is, based on the detected face information, the IoF computation determines a confidence that a detected face in a region corresponds to the person associated with the named entity information.

At operation 430, the regions with the top-K weights and the corresponding confidence scores are aggregated to obtain a delta score.

As shown in FIG. 1, at operation 140, the initial ranking score, which was determined by the scoring model based on the anonymous query, is modified based on the delta score corresponding to the name information. Accordingly, the final ranking score is based on the anonymized query and the proper names from the input query to provide an image searching function that can retrieve images based on a natural language input including proper names.

Figure 5:
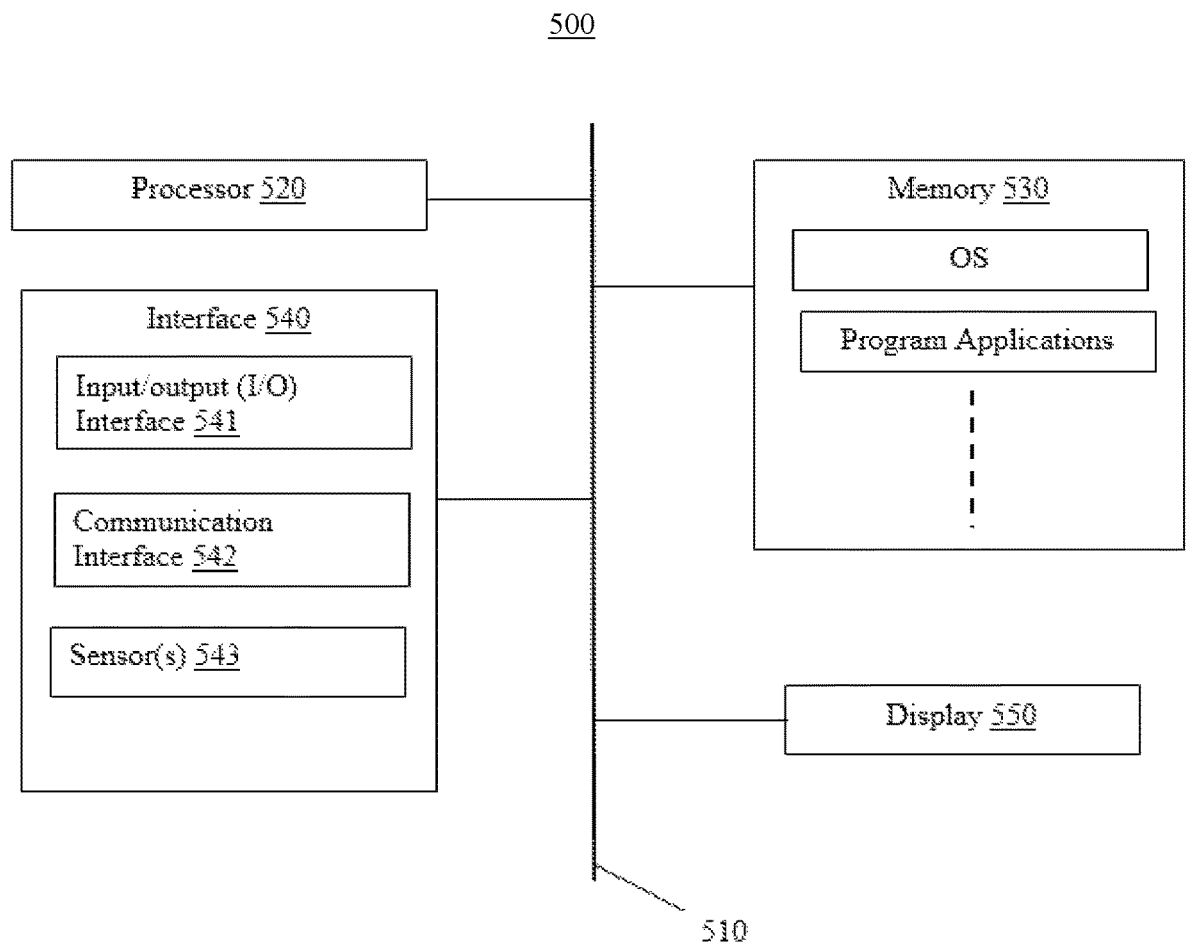
FIG. 5 diagram of an electronic device for performing the personalized image and video searching method according to an embodiment.
Figure 6:
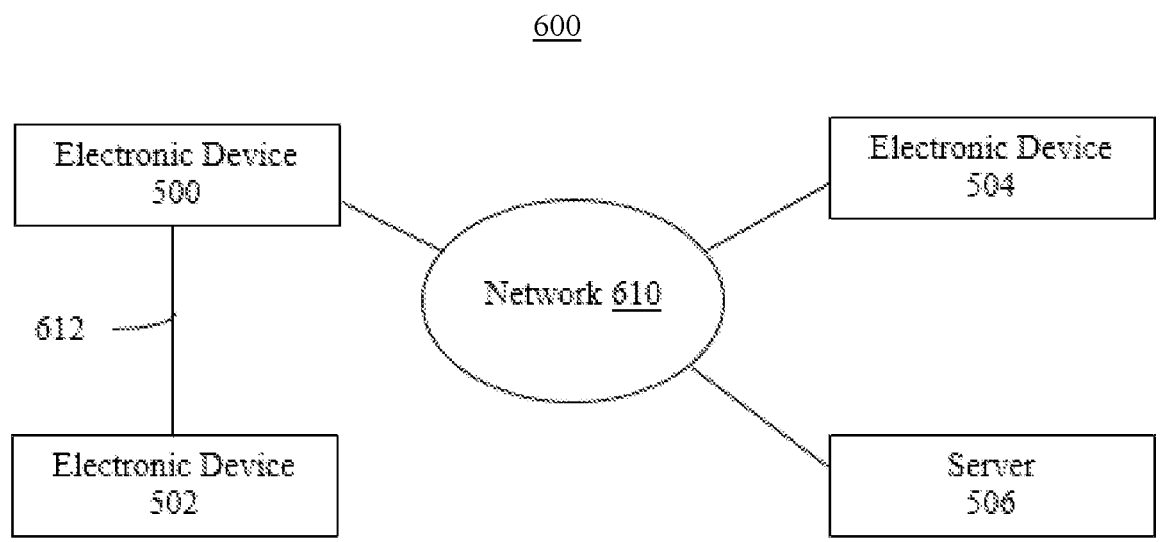
FIG. 6 is a diagram of a network environment for performing the personalized image and video searching method according to an embodiment.

The method 100 may be performed by electronic device 500 of FIG. 5, in a network environment 600 as shown in FIG. 6, according to an embodiment. FIGS. 5 and 6 are for illustration only, and other embodiments of the electronic device and network could be used without departing from the scope of this disclosure.

As shown in FIG. 5 electronic device 500 includes at least one of a bus 510, a processor 520 (or a plurality of processors), a memory 530, an interface 540, or a display 550.

Bus 510 may include a circuit for connecting the components 520, 530, 540, and 550 with one another. Bus 510 may function as a communication system for transferring data between the components, or between electronic devices.

Processor 520 may include one or more of a central processing unit (CPU), a graphics processor unit (GPU), an accelerated processing unit (APU), many integrated core (MIC), a field-programmable gate array (FPGA), or a digital signal processing (DSP). Processor 520 may control at least one of other components of electronic device 500, and/or perform an operation or data processing relating to communication. Processor 520 may execute one or more programs stored in memory 530.

Memory 530 may include a volatile and/or a non-volatile memory. Memory 530 may store information, such as one or more commands, data, programs (one or more instructions), or applications, etc., that is related to at least one other component of the electronic device 500 and for driving and controlling electronic device 500. For example, commands or data may formulate an operating system (OS). Information stored in memory 530 may be executed by processor 520.

The application may include one or more embodiments as discussed above. These functions can be performed by a single application or by multiple applications that each carry out one or more of these functions.

Display 550 may include, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. Display 550 can also be a depth-aware display, such as a multi-focal display. Display 550 is able to present, for example, various contents (such as text, images, videos, icons, or symbols).

Interface 540 may include input/output (I/O) interface 541, communication interface 542, and/or one or more sensors 543. I/O interface 541 serves as an interface that can, for example, transfer commands or data between a user or other external devices and other component(s) of electronic device 500.

Sensor(s) 543 may meter a physical quantity or detect an activation state of electronic device 500 and may convert metered or detected information into an electrical signal. For example, sensor(s) 543 may include one or more cameras or other imaging sensors for capturing images of scenes. The sensor(s) 543 may also include a microphone, a keyboard, a mouse, one or more buttons for touch input, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (EGG) sensor, an infrared (IR) sensor, an ultrasound sensor, an iris sensor, or a fingerprint sensor. The sensor(s) 543 can further include an inertial measurement unit. In addition, sensor(s) 543 can include a control circuit for controlling at least one of the sensors included here. Any of these sensor(s) 543 can be located within or coupled to electronic device 500. Sensor(s) 543 may be used to detect touch input, gesture input, hovering input using an electronic pen or a body portion of a user, etc.

Communication interface 542, for example, may be able to set up communication between electronic device 500 and an external electronic device (such as a first electronic device 502, a second electronic device 504, or a server 506 as shown in FIG. 6). As shown in FIG. 6, communication interface 542 may be connected with a network 610 and/or 612 through wireless or wired communication architecture to communicate with an external electronic device. Communication interface 142 may be a wired or wireless transceiver or any other component for transmitting and receiving signals.

FIG. 6 shows an example network configuration 600 according to an embodiment. Electronic device 500 of FIG. 5 may be connected with a first external electronic device 502, a second external electronic device 504, or a server 506 through network 610 and/or 612. Electronic device 500 may be wearable device, an electronic device-mountable wearable device (such as an FIMD), etc. When electronic device 500 is mounted in the electronic device 502 (such as the FIMD), electronic device 500 may communicate with electronic device 502 through communication interface 542. Electronic device 500 may be directly connected with electronic device 502 to communicate with electronic device 502 without involving a separate network. Electronic device 500 may also be an augmented reality wearable device, such as eyeglasses, that include one or more cameras.

The first and second external electronic devices 502 and 504 and server 506 may each be a device of a same or a different type than electronic device 500. According to some embodiments, server 506 may include a group of one or more servers. Also, according to some embodiments, all or some of the operations executed on electronic device 500 may be executed on another or multiple other electronic devices (such as electronic devices 502 and 504 or server 506). Further, according to some embodiments, when electronic device 500 should perform some function or service automatically or at a request, electronic device 500, instead of executing the function or service on its own or additionally, can request another device (such as electronic devices 502 and 504 or server 506) to perform at least some functions associated therewith. The other electronic device (such as electronic devices 502 and 504 or server 506) may be able to execute the requested functions or additional functions and transfer a result of the execution to electronic device 500. Electronic device 500 can provide a requested function or service by processing the received result as it is or additionally. To that end, a cloud computing, distributed computing, or client-server computing technique may be used, for example. While FIGS. 5 and 6 show that electronic device 500 including communication interface 542 to communicate with external electronic devices 502 and 504 or server 506 via the network 610 or 612, electronic device 500 may be independently operated without a separate communication function according to some embodiments.

Server 506 may include the same or similar components 510, 520, 530, 540, and 550 as electronic device 500 (or a suitable subset thereof). Server 506 may support driving electronic device 500 by performing at least one of operations (or functions) implemented on electronic device 500. For example, server 506 can include a processing module or processor that may support processor 520 of electronic device 500.

The wireless communication may be able to use at least one of, for example, long term evolution (LTE), long term evolution-advanced (LTE-A), 5th generation wireless system (5G), millimeter-wave or 60 GFIz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection may include, for example, at least one of a universal serial bus (USB), high definition multimedia interface (HDMI), recommended standard 232 (RS-232), or plain old telephone service (POTS). The network 610 or 612 includes at least one communication network, such as a computer network (like a local area network (LAN) or wide area network (WAN)), Internet, or a telephone network.

Although FIG. 6 shows one example of a network configuration 600 including an electronic device 500, two external electronic devices 502 and 504, and a server 506, various changes may be made to FIG. 6. For example, the network configuration 500 could include any number of each component in any suitable arrangement. In general, computing and communication systems come in a wide variety of configurations, and FIG. 5 does not limit the scope of this disclosure to any particular configuration. Also, while FIG. 5 shows one operational environment in which various features disclosed in this patent document can be used, these features could be used in any other suitable system.

The forecasting method may be written as computer-executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to electronic device 100, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

The personalized image and video searching method may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server or a storage medium of server 106.

Figure 7:
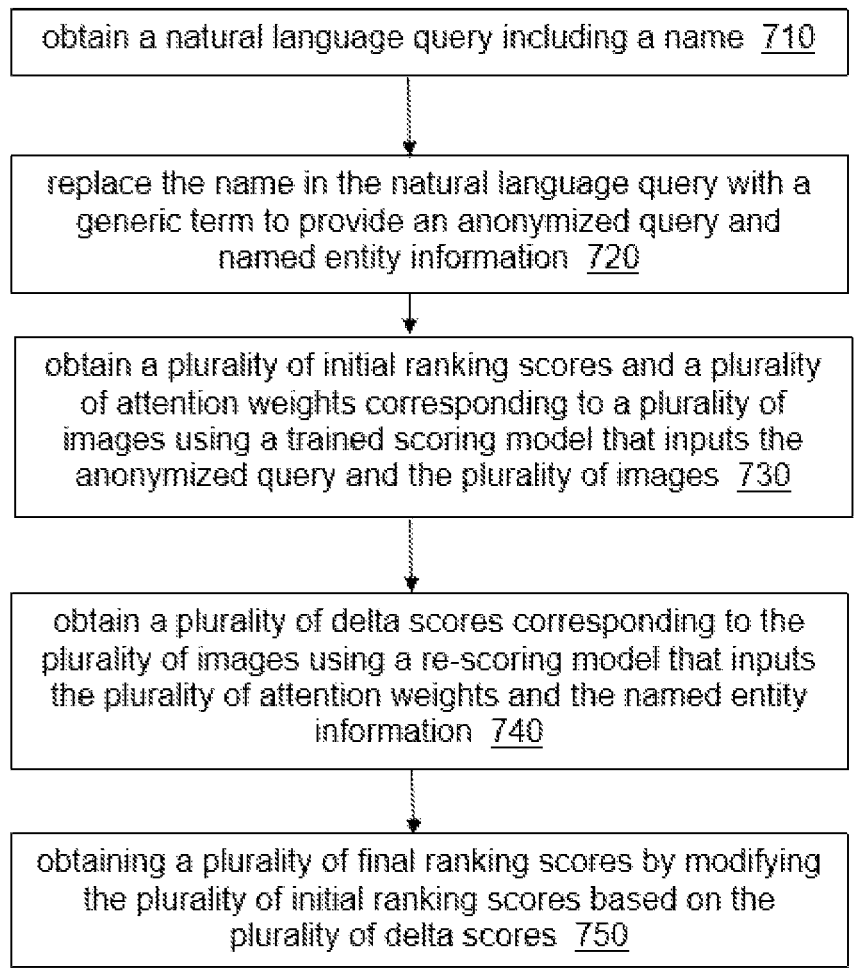
FIG. 7 is a flowchart of a method for personalized image and video searching based on natural language inputs according to an embodiment.

FIG. 7 is a flowchart of a method 700 of personalized image or video searching based on natural language inputs according to an embodiment.

At operation 710, a natural language query including a name (or multiple names) may be obtained. For example, a query may state "Sheldon is standing next to Amy." According to an embodiment, when the method 700 is being performed on device 500, the natural language query may be obtained through the I/O interface 541 based on a user input or may be received through the communication interface 542.

At operation 720, the name (or multiple names) in the natural language query may be replaced with a generic term (or multiple generic terms) to provide an anonymized query and named entity information. The anonymized query may be obtained through the process shown in FIGS. 2 and 3 to obtain the anonymized query "man is standing next to woman" and the named entity information "Sheldon" and "Amy." The anonymized query may be converted into a query vector (e.g., E={$e_1, \ldots, e_n$}) in a common embedding space where n equals the number of tokens in the anonymized query. According to an embodiment, each token represents one word of the query.

At operation 730, a plurality of initial ranking scores and a plurality of attention weights may be obtained for each of a plurality of images using a trained scoring model that inputs the anonymized query and the plurality of images. The trained scoring model may obtain a feature vector V={$v_1, \ldots, v_k$} in the common embedding space for each image where k equals a number of image region proposals.

According to an embodiment, the trained scoring model may determine a similarity score between the query vector and the feature vector which are both mapped to the common embedding space. The similarity score between region i and token j may be obtained using the following equations.

The cosine similarity between region i and token j is represented by Equation 1.

$$S_{ij} = \frac{v_i^T e_j}{\|v_i\|\|e_j\|} \quad \text{[Equation 1]}$$

The similarities are normalized and thresholded at zero to provide Equation 2.

$$\bar{s}'_{ij} = \frac{[s_{ij}]_+}{\sqrt{\sum_{j=1}^{n}[s_{ij}]_+^2}} \quad \text{[Equation 2]}$$

A weighted combination of image region features ay is defined in Equation 3.

$$a_j^v = \sum_{i=1}^{k} \alpha'_{ij} v_i \quad \text{[Equation 3]}$$

Equation 4 shows what $\alpha_{ij}'$ represents in Equation 3.

$$\alpha'_{ij} = \frac{\exp(\lambda_1 \bar{s}'_{ij})}{\sum_{i=1}^{k} \exp(\lambda_1 \bar{s}'_{ij})} \quad \text{[Equation 4]}$$

The similarity between $a_j^v$ and $e_j$ is shown in Equation 5.

$$R(e_j, a_j^v) = \frac{e_j^T a_j^v}{\|e_j^T\| \|a_j^v\|} \quad \text{[Equation 5]}$$

The similarity score between the feature vector and the query vector is obtained based on Equation 6.

$$S(I_t, Q) = \frac{\sum_{i=1}^{k} R(e_j, a_j^v)}{n} \quad \text{[Equation 6]}$$

According to other embodiments, pooling operations such as LogSumExp pooling may be used when obtaining the initial similarity score.

At operation 740, a delta score may be obtained for each of the plurality of images using a re-scoring model that inputs the plurality of attention weights and the named entity information.

In the following disclosure, the set of names of all known identities in the query is represented by K, and a single person name token P∈K. According to an embodiment, the delta score may be obtained based on the following process in which the named entity information includes a token P representing a single name in the input query that is the z-th token in the input query.

In some cases, the region $e_z$ that is most attended to may not contain a face (e.g., could include a different body part). As such, a top m regions with the highest attention values (i.e., highest $a_{iz}'$ values) may be selected, where m is a hyper parameter. By implementing this selection process, $\sigma_m(P)$ may be the set of identifiers of the regions that $e_z$ is most attended to, as shown in Equation 7 below.

$$\sigma_m(P) = \arg\max_{s \subset \{1,\ldots,n\}, |s|=m} \sum_{i \in s} a_{iz}' \quad \text{[Equation 7]}$$

Equation 8 (below) defines the IoF between F(P) and $R_\sigma$, where F(P) is a face region corresponding to name P, $R_\sigma$ is the image region corresponding to σ, and |·| is a size of the region bounding box.

$$IoF(F(P), R_\sigma) = \frac{|F(P) \cap R_\sigma|}{|F(P)|} \quad \text{[Equation 8]}$$

For each token P in the query, an identity confidence score h(P) may be obtained based on Equation 9 (below).

$$h(P) = \max_{\sigma \in \sigma_m(P)} IoF(F(P), R_\sigma). \quad \text{[Equation 9]}$$

The delta score may be determined based on Equation 10 (below).

$$\text{delta score} = \sum_{P \in K} h(P)\delta \quad \text{[Equation 10]}$$

In Equation 10, δ is a constant hyper parameter greater than zero (for example, δ=0.1).

At operation 750, a plurality of final ranking scores may be obtained by modifying the plurality of initial ranking scores based on the plurality of delta scores. For example, a final ranking score for an image $\hat{S}(I_t, Q)$ may be obtained based on Equation 11 which adds the delta score to the initial ranking score $\hat{S}(I_t, Q)$.

$$\hat{S}(I_t, Q) = S(I_t, Q) + \sum_{P \in \mathcal{P}} h(P)\delta. \quad \text{[Equation 11]}$$

If there are multiple faces detected for P, h(P) may be set to zero due to potential reliability issues of the face detector.

According to some embodiments, a face filter can be applied to the final similarity score for each image. For example, if no faces of named entities are detected in an image (i.e., a current frame of a video), the score of the image will not be considered, or equivalently, set to negative infinity when the aggregation function is max pooling.

Figure 8:
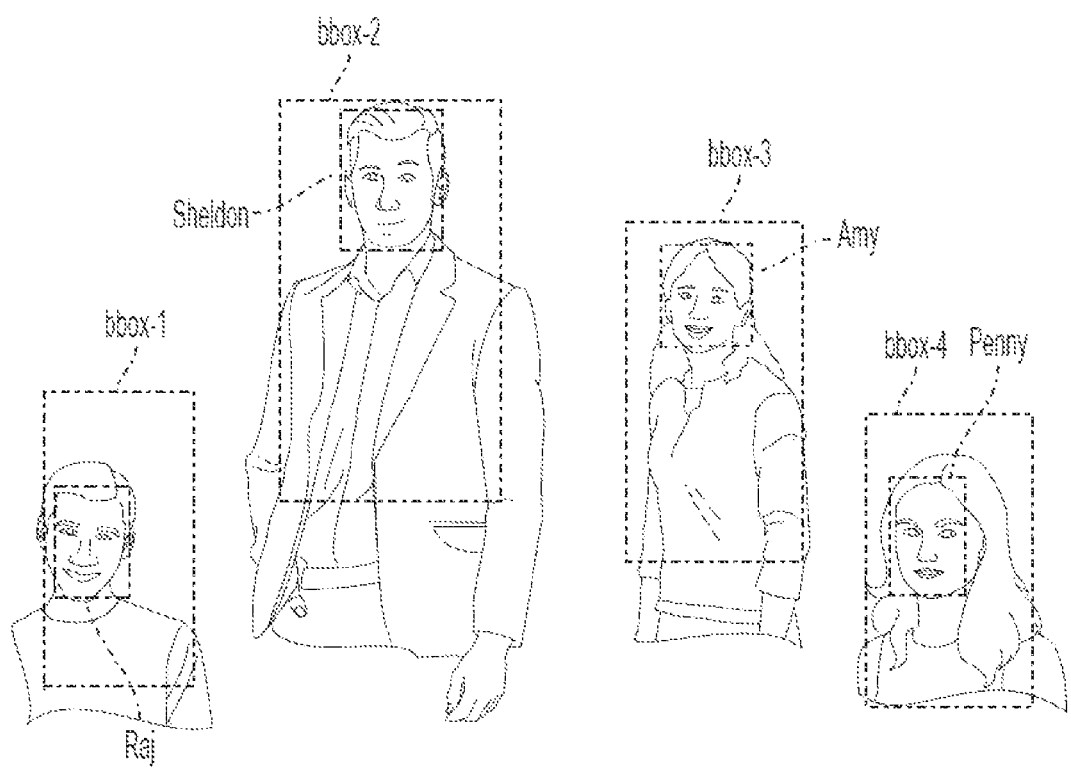
FIG. 8 is a diagram for explaining the implementation of the method for personalized image and video searching on an image according to an embodiment.

FIG. 8 is a diagram for explaining the implementation of the method 700 on an image according to an embodiment. In FIG. 8, the text "Sheldon is standing next to Amy" is input as the query, which is converted into the anonymized query "man is standing next to woman."

Based on the query "man is standing next to woman," the trained scoring model obtains bounding regions bbox-1 through bbox-4 in the image. Attention weights corresponding to each token of the anonymized query are obtained for each bounding region. As such, attention weights [$w_1$, $w_2$, $w_3$, $w_4$] for the "man" token and attention weights [$u_1$, $u_2$, $u_3$, $u_4$] for the "women" token are obtained for bbox-1 through bbox-4.

The re-scoring model inputs the attention weights [$w_1$, $w_2$, $w_3$, $w_4$] for the "man" token and attention weights [$u_1$, $u_2$, $u_3$, $u_4$] for the "women" token, the named entity information (e.g., "Sheldon" and "Amy"), and face information obtained from the face database.

If the weight $w_2$ has the highest value over all weights $w_1$-$w_4$, the contextualized embedding of the "man" token (i.e., the embedding not only contains object information, but also context information such as action of the person) can be grounded to bbox-2. Combining the named entity information, face information, and bounding region information corresponding to bbox-2, there is a high certainty/probability that bbox-2 contains the face of Sheldon, which indicates that the image is likely the image to which the query is referring. Thus, the initial ranking score for the image, that was generated by the trained model, is increased based on the name specific processing of the re-scoring model. The "women" tokens may be processed in a similar manner.

The above discussion refers to processing single images, which may be frames of a video. According to an embodiment, video searching may be performed as discussed below. For video I and query Q, the initial ranking score S(I,Q) may be obtained based on Equation 12 (below).

$$S(I,Q) = AGG(\{S(I_t, Q) | I_t \in I\}) \quad \text{[Equation 12]}$$

In Equation 12, $I_t$ is the t-th frame of video I and AGG(·) is the aggregation function. According to an embodiment, AGG(·) may take the form of max or average pooling, or weighted average of the image specific scores can be learned.

According to an embodiment, the re-scoring model may modify the attention weights $a_{ij}'$ obtained through the trained model, as opposed to modifying the similarity scores produced by the trained model.

In Equation 13 (below), Z represents a set of query token indexes corresponding to the named entity. For example, if the person name token P is the z-th token, then z∈Z. As such, the modified attention weights are obtained as shown in Equation 13.

$$\beta'_{ij} = Relu\left(\alpha'_{ij} - \sum_{z \in Z}(1 - h_{iz})\alpha'_{iz}q_{zj}\right) \quad \text{[Equation 13]}$$

In Equation 13, $h_{iz}$ denotes the confidence that region I corresponds to named person z and $q_{iz}$ is the similarity between the z-th and j-the token, as shown in Equation 14 (below).

$$q_{zj} = Relu\left(\frac{e_z^T e_j}{\|e_z\|\|e_j\|}\right) \quad \text{[Equation 14]}$$

According to an embodiment, the confidence term $h_{iz}$ can be binary. For example, $h_{iz}=1$ if $IoF(F(z),R_i)$ is bigger than a certain threshold, and $h_{iz}=0$ otherwise.

According to another embodiment, $h_{iz}$ can be obtained based on Equation 15 (below).

$$h_{iz} = \frac{IoF(F(z), R_i)}{\sum_{F \in \mathcal{F}(R_i)} IoF(F, R_i) + c_g} IoF(F(z), R_i) \quad \text{[Equation 15]}$$

In Equation 15, the face regions that intersect with region $R_i$ are set to be $F(R_i)$ and $0<c_g<1$. If the face corresponding to the z-th token has been detected and $F(z) \in F(R_i)$ (i.e., the face region intersects with $R_i$), $h_{iz}$ is determined based on Equation 15. If $F(P) \notin \mathcal{F}(R_\sigma)$, $h_{iz}$ is set to zero.

According to an embodiment, the trained scoring model may be downloaded to a device performing the method 700. At inference time, the method 700 may user on-device data to do retrieval. Since visual feature extraction is independent of query processing, video features can be precomputed and stored for inference.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A method of personalized image retrieval comprising:
   obtaining a natural language query including an identifier;
   replacing the identifier in the natural language query with a generic term to provide an anonymized query and entity information regarding the identifier;
   obtaining a plurality of first ranking scores and a plurality of attention weights corresponding to a plurality of images by inputting the anonymized query and the plurality of images to a first scoring model;
   obtaining a plurality of scores corresponding to the plurality of images by inputting the plurality of attention weights and the entity information to a second scoring model; and
   obtaining a plurality of second ranking scores by modifying the plurality of first ranking scores based on the plurality of scores,
   wherein the first scoring model performs semantic based searching, and
   wherein the second scoring model determines a probability that one or more faces detected in the plurality of images correspond to the identifier.

2. The method of claim 1, wherein the plurality of attention weights of the plurality of images are based on bounding regions of the plurality of images and corresponding similarity scores, and
   wherein the similarity scores are obtained based on semantic information obtained from the anonymized query.

3. The method of claim 2, wherein the first scoring model obtains the bounding regions using a feature extraction model and obtains the semantic information using a contextualized language model.

4. The method of claim 2, wherein the second scoring model is configured to detect face regions in the plurality of images and obtains the plurality of scores based on a spatial relationship between the bounding regions and the detected face regions.

5. The method of claim 4, wherein the second scoring model is configured to generate a positive score for a current image based on a face corresponding to the identifier being located within a bounding region of the current image.

6. The method of claim 1, wherein the natural language query includes a plurality of identifiers, and the plurality of scores are obtained based on entity information corresponding to the plurality of identifiers.

7. The method of claim 1, wherein the plurality of second ranking scores are obtained by adding the plurality of scores to the plurality of first ranking scores.

8. An apparatus for personalized image retrieval, the apparatus comprising:
   at least one memory storing instructions; and
   at least one processor configured to execute the instructions to:
   obtain a natural language query including an identifier;
   replace the identifier in the natural language query with a generic term to provide an anonymized query and entity information regarding the identifier;
   obtain a plurality of first ranking scores and a plurality of attention weights corresponding to a plurality of images by inputting the anonymized query and the plurality of images to a first scoring model;

obtain a plurality of scores corresponding to the plurality of images by inputting the plurality of attention weights and the entity information to a second scoring model; and obtaining a plurality of second ranking scores by modifying the plurality of first ranking scores based on the plurality of scores, wherein the first scoring model performs semantic based searching, and wherein the second scoring model determines a probability that one or more faces detected in the plurality of images correspond to the identifier.

9. The apparatus of claim 8, wherein the plurality of attention weights of the plurality of images are based on bounding regions of the plurality of images and corresponding similarity scores, and wherein the similarity scores are obtained based on semantic information obtained from the anonymized query.

10. The apparatus of claim 9, wherein the first scoring model obtains the bounding regions using a feature extraction model and obtains the semantic information using a third scoring model.

11. The apparatus of claim 9, wherein the second scoring model is configured to detect face regions in the plurality of images and obtains the plurality of scores based on a spatial relationship between the bounding regions and the detected face regions.

12. The apparatus of claim 10, wherein the second scoring model is configured to generate a positive score for a current image based on a face corresponding to the identifier being located within a bounding region of the current image.

13. The apparatus of claim 8, wherein the natural language query includes a plurality of identifiers, and the plurality of scores are obtained based on entity information corresponding to the plurality of identifiers.

14. The apparatus of claim 8, wherein the plurality of second ranking scores are obtained by adding the plurality of scores to the plurality of first ranking scores.

15. A non-transitory computer-readable medium storing instructions, the instructions comprising: one or more instructions that, when executed by one or more processors, cause the one or more processors to:

obtain a natural language query including an identifier;

replace the identifier in the natural language query with a generic term to provide an anonymized query and entity information regarding the identifier;

obtain a plurality of first ranking scores and a plurality of attention weights corresponding to a plurality of images by inputting the anonymized query and the plurality of images to a first scoring model;

obtain a plurality of scores corresponding to the plurality of images by inputting the plurality of attention weights and the entity information to a second scoring model; and obtaining a plurality of second ranking scores by modifying the plurality of first ranking scores based on the plurality of scores, wherein the first scoring model performs semantic based searching, and wherein the second scoring model determines a probability that one or more faces detected in the plurality of images correspond to the identifier.

16. The non-transitory computer-readable medium of claim 15, wherein the plurality of attention weights of the plurality of images are based on bounding regions of the plurality of images and corresponding similarity scores, and wherein the similarity scores are obtained based on semantic information obtained from the anonymized query.

17. The non-transitory computer-readable medium of claim 16, wherein the first scoring model obtains the bounding regions using a feature extraction model and obtains the semantic information using a contextualized language model.

18. The non-transitory computer-readable medium of claim 16, wherein the second scoring model is configured to detect face regions in the plurality of images and obtains the plurality of scores based on a spatial relationship between the bounding regions and the detected face regions.

19. The non-transitory computer-readable medium of claim 18, wherein the second scoring model generates a positive score for a current image based on a face corresponding to the identifier being located within a bounding region of the current image.

20. The non-transitory computer-readable medium of claim 15, wherein the natural language query includes a plurality of identifiers and the plurality of scores are obtained based on entity information corresponding to the plurality of identifiers.

* * * * *